(12) United States Patent
Chiou et al.

(10) Patent No.: US 7,436,625 B1
(45) Date of Patent: Oct. 14, 2008

(54) DISK DRIVE SPINDLE MOTOR HAVING A CAVITY DEFINED BY ONE OF AN UPPER SURFACE OF A STATOR SUPPORT STRUCTURE AND A LOWER SURFACE OF A STATOR TOOTH

(75) Inventors: Shan-Shuong Chiou, Saratoga, CA (US); Shuo-Hao Chen, Cupertino, CA (US); Raffi Codilian, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 494 days.

(21) Appl. No.: 11/032,946

(22) Filed: Jan. 11, 2005

(51) Int. Cl.
*G11B 17/02* (2006.01)

(52) U.S. Cl. .................. 360/98.07; 360/99.08
(58) Field of Classification Search .............. 360/98.07, 360/99.04, 99.08
See application file for complete search history.

(56) References Cited

U.S. PATENT DOCUMENTS

| | | | |
|---|---|---|---|
| 4,965,476 A | 10/1990 | Lin | |
| 6,104,570 A | 8/2000 | Pelstring | |
| 6,455,961 B1 * | 9/2002 | Higuchi | 310/67 R |
| 6,608,734 B1 | 8/2003 | Herndon et al. | |
| 6,700,241 B1 * | 3/2004 | Horng et al. | 310/67 R |
| 7,265,939 B2 * | 9/2007 | Kuwajima et al. | 360/99.08 |
| 2002/0006012 A1 * | 1/2002 | Yoshikawa et al. | 360/99.08 |

* cited by examiner

*Primary Examiner*—A. J. Heinz
(74) *Attorney, Agent, or Firm*—Barcelo & Harrison, LLP

(57) ABSTRACT

A spindle motor includes a shaft defining a longitudinal axis, a hub, a bearing assembly disposed between the hub and the shaft for allowing the hub to rotate, and a stator. The stator includes an inner diameter, an outer diameter, a stator tooth having a distal end, and a coil wound around the stator tooth. The stator tooth has a lower surface extending between the coil and the distal end of the stator tooth. The spindle motor includes a stator support structure supporting one of the inner and outer diameters, the stator support structure having an upper surface facing the lower surface, wherein at least one of the upper surface of the stator support structure and the lower surface of the stator tooth defines a cavity.

16 Claims, 4 Drawing Sheets

DISK DRIVE SPINDLE MOTOR HAVING A CAVITY DEFINED BY ONE OF AN UPPER SURFACE OF A STATOR SUPPORT STRUCTURE AND A LOWER SURFACE OF A STATOR TOOTH

BACKGROUND OF THE INVENTION

1. Field of the Invention

This invention relates to a spindle motor used in a disk drive. More particularly, this invention relates to a spindle motor having a stator support structure supporting one of the inner and outer diameters of a stator.

2. Description of the Prior Art and Related Information

A huge market exists for disk drives such as hard disk drives for mass-market host computer systems such as servers, desktop computers, laptop computers, and consumer electronics devices such as a digital video recorder ("DVR"). To be competitive in this market, a hard disk drive must be relatively inexpensive, and must accordingly embody a design that is adapted for low-cost mass production. In addition, it must provide substantial capacity, rapid access to data, reliable performance, and in certain acoustic-sensitive applications such as consumer electronics devices, low acoustics. Numerous manufacturers compete in this huge market and collectively conduct substantial research and development, at great annual cost, to design and develop innovative hard disk drives to meet increasingly demanding customer requirements.

Each of numerous contemporary mass-market hard disk drive models provides relatively large capacity, often in excess of 80 gigabytes per drive. Nevertheless, there exists substantial competitive pressure to develop mass-market hard disk drives that have even higher capacities and that provide rapid access. Another requirement to be competitive in this market is that the hard disk drive must conform to a selected standard exterior size and shape often referred to as a "form factor." Generally, capacity is desirably increased without increasing the form factor or the form factor is reduced without decreasing capacity.

Satisfying these competing constraints of low-cost, small size, high capacity, low acoustics, and rapid access requires innovation in each of numerous components and methods of assembly including methods of assembly of various components into certain subassemblies. Typically, the main assemblies of a hard disk drive are a head disk assembly and a printed circuit board assembly.

The head disk assembly includes an enclosure including a base and a cover, at least one disk having at least one recording surface, a spindle motor for causing each disk to rotate, and an actuator arrangement. The printed circuit board assembly includes circuitry for processing signals and controlling operations. Actuator arrangements can be characterized as either linear or rotary; substantially every contemporary cost-competitive small form factor drive employs a rotary actuator arrangement.

The spindle motor includes a stator, which typically includes a plurality of laminated stator teeth with a coil wound around the teeth. The stator may be attached to a surface of a spindle motor bracket such that the stator teeth and the coil are cantilevered; for example, an inner diameter of the stator may be attached to the surface of the spindle motor bracket. When the spindle motor is spun up in a disk drive, the stator may vibrate at its natural frequencies, generally between 10 KHz and 20 KHz. Such vibrations from the stator may lead to higher acoustics, which may exceed the acoustic requirements in certain acoustic-sensitive applications such as consumer electronics devices.

SUMMARY OF THE INVENTION

This invention can be regarded as a spindle motor for a disk drive. The spindle motor includes a shaft, a hub, a bearing assembly disposed between the hub and the shaft for allowing the hub to rotate, and a stator. The stator includes an inner diameter, an outer diameter, a stator tooth having a distal end, a coil wound around the stator tooth, the stator tooth having a lower surface extending between the coil and the distal end of the stator tooth. The spindle motor includes a stator support structure supporting one of the inner and outer diameters, the stator support structure having an upper surface facing the lower surface, wherein at least one of the upper surface of the stator support structure and the lower surface of the stator tooth defines a cavity.

This invention can also be regarded as a disk drive including a base, a spindle motor attached to the base, and a disk supported by the spindle motor. The spindle motor includes a shaft, a hub, a bearing assembly disposed between the hub and the shaft for allowing the hub to rotate, and a stator. The stator includes an inner diameter, an outer diameter, a stator tooth having a distal end, and a coil wound around the stator tooth, the stator tooth having a lower surface extending between the coil and the distal end of the stator tooth. The spindle motor includes a stator support structure supporting one of the inner and outer diameters, the stator support structure having an upper surface, wherein at least one of the upper surfaces of the stator support structure and the lower surface of the stator tooth defines a cavity.

DETAILED DESCRIPTION

Figure 1:
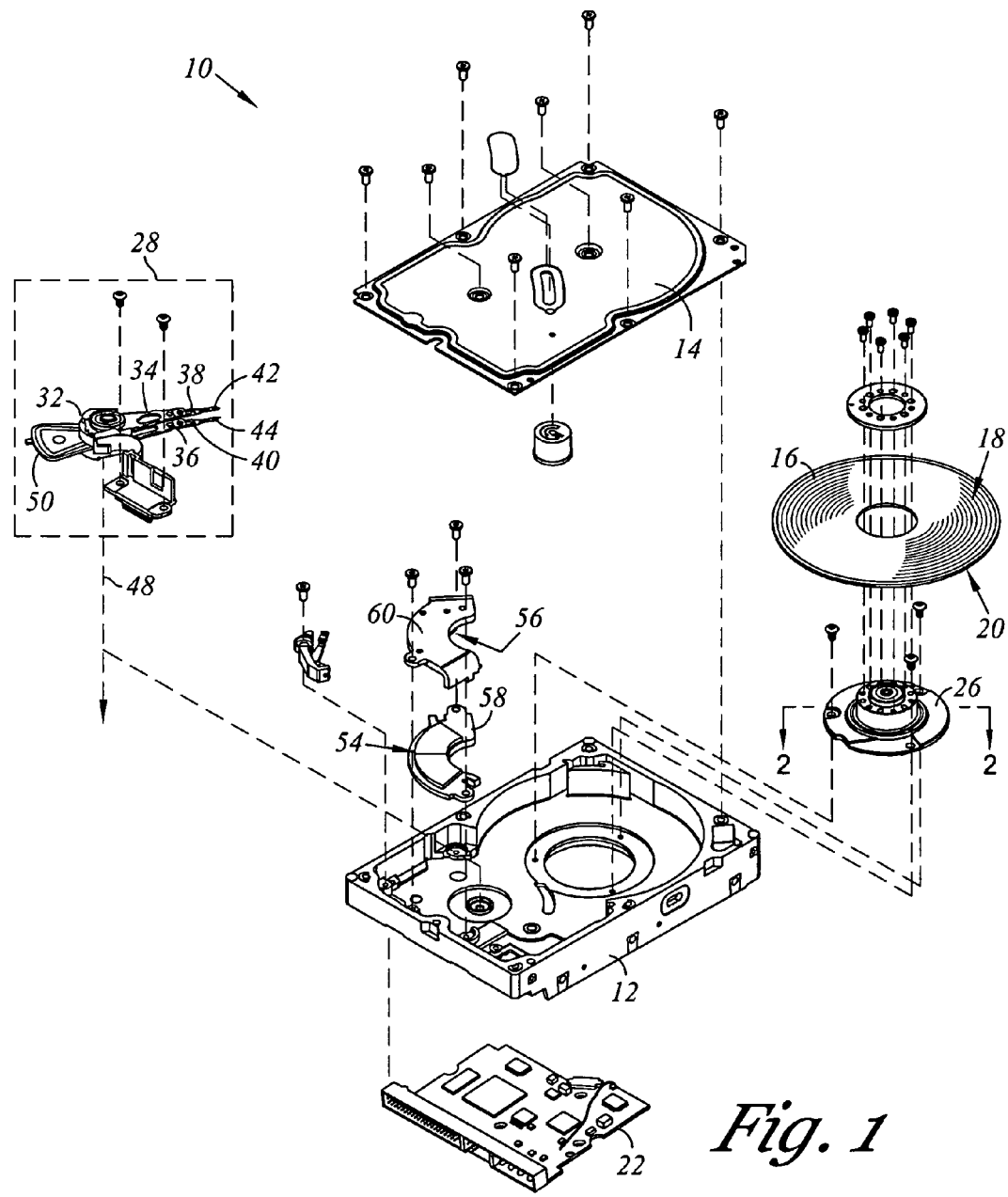
FIG. 1 is an exploded perspective view of a disk drive incorporating an embodiment of this invention.

With reference to FIGS. 1-3 and 5, a disk drive 10 includes a base 12, a spindle motor 26 attached to base 12, and a disk 16 supported by spindle motor 26. Spindle motor 26 includes a shaft 62, a hub 66, a bearing assembly 68 disposed between hub 66 and shaft 62 for allowing hub 66 to rotate, and a stator 80. Stator 80 includes an inner diameter 92, an outer diameter 94, a stator tooth 84 having a distal end 95, and a coil 82 wound around stator tooth 84. Stator tooth 84 has a lower surface extending between coil 82 and distal end 95 of stator tooth 84, the lower surface being generally denoted by 99. Spindle motor 26 includes a stator support structure 86 supporting one of inner 92 and outer 94 diameters, stator support structure 86 having an upper surface facing lower surface 99, the upper surface being generally denoted by 98. Spindle motor 26 includes at least one of upper surface 98 of stator support structure 86 and lower surface 99 of stator tooth 84 defining a cavity 102.

Continuing with FIG. 1, disk drive 10 includes a cover 14, a printed circuit board 22 attached to base 12, a head stack assembly 28, and VCM plates 60, 58, each having a respective magnet 56 or 54. Head stack assembly 28 includes an actuator body 32, a coil portion 50, a flex circuit assembly (not numbered) attached to actuator body 32, and a pair of actuator arms 34, 36. Head stack assembly 28 includes a head gimbal assembly 38 attached to actuator arm 34 and a head gimbal assembly 40 attached to actuator arm 36, with each head gimbal assembly having a respective head 42 or 44. Head stack assembly 28 pivots relative to pivot axis 48. Disk 16 includes a top recording surface 18 and a bottom recording surface 20 or alternatively, one of the recording surfaces may be used. In an alternative embodiment, a plurality of disks with a corresponding number of heads may be used in disk drive 10.

Figure 2:
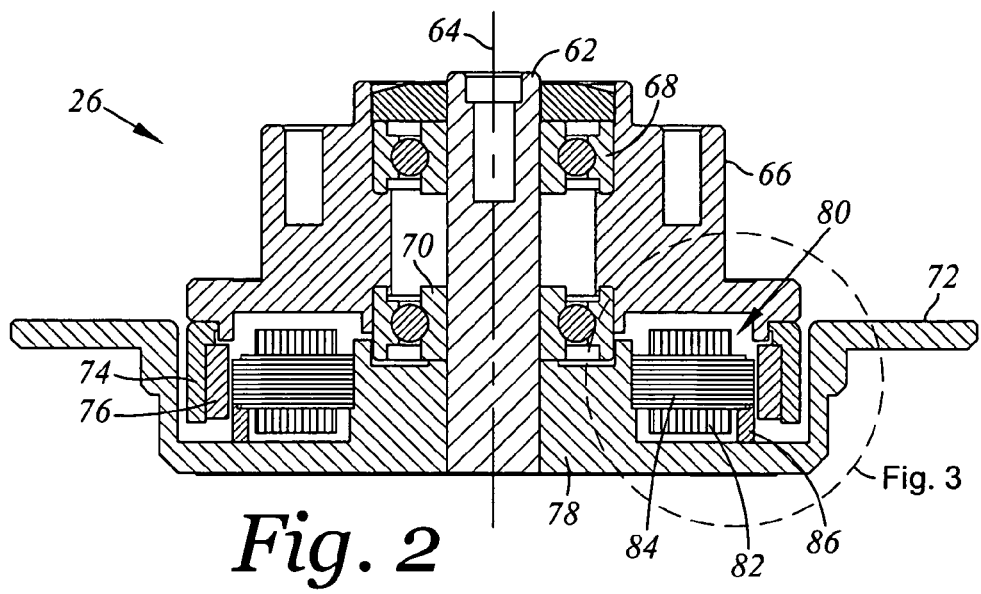
FIG. 2 is a cross section view of the spindle motor shown in FIG. 1.
Figure 3:
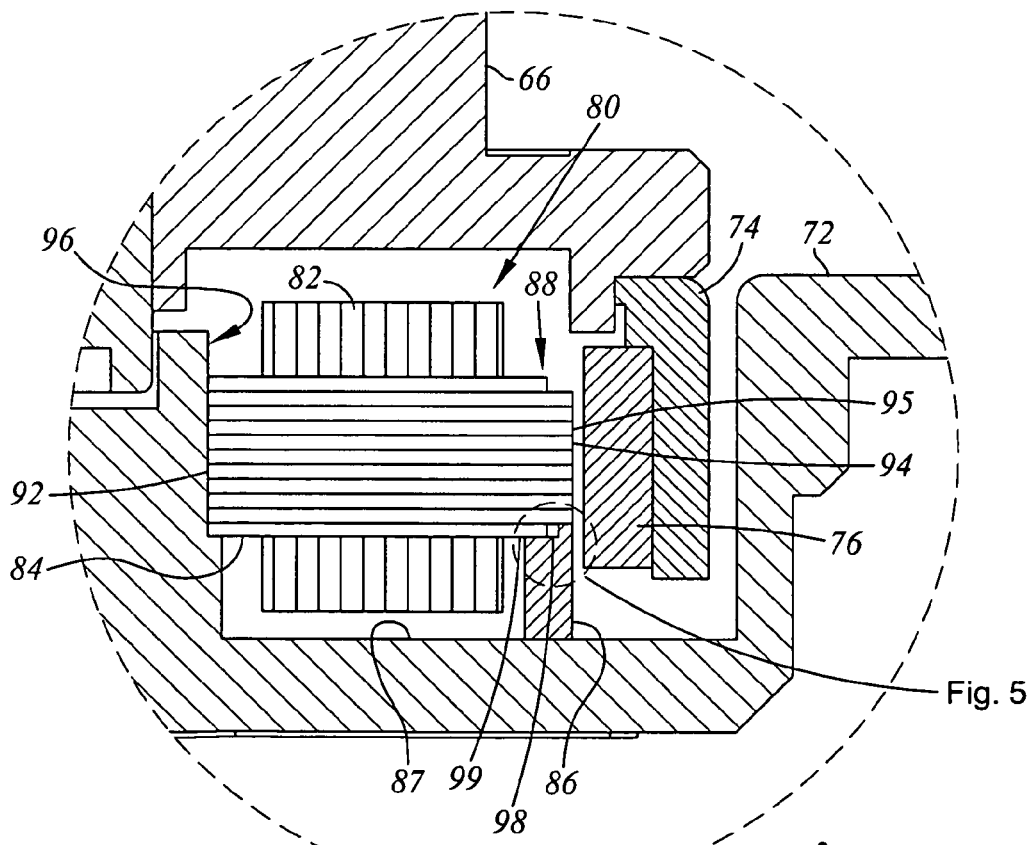
FIG. 3 is an enlarged cross section view of a portion of FIG. 2.
Figure 5:
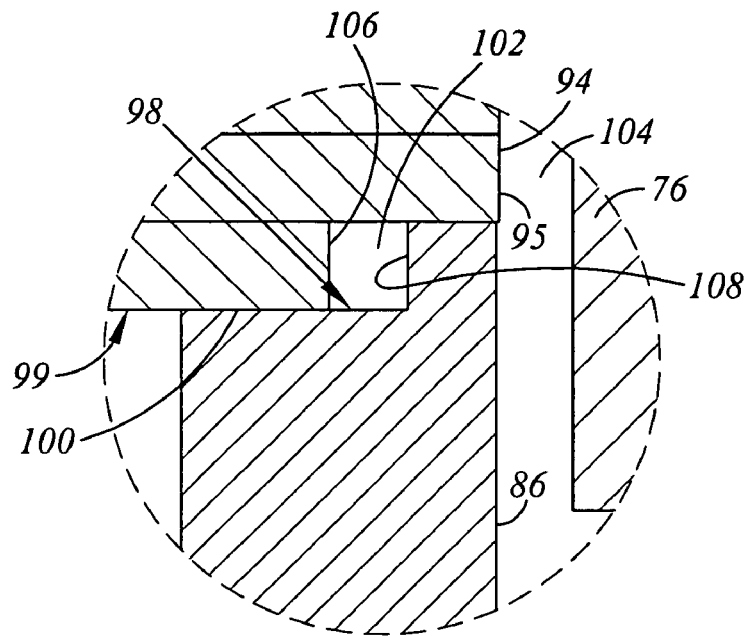
FIG. 5 is an enlarged cross section view of a portion of FIG. 3.

Continuing with FIGS. 2-3 and 5, spindle motor 26 includes shaft 62 defining a longitudinal axis 64, another bearing assembly 70 longitudinally spaced-apart from bearing assembly 68, a bracket 72, a back iron 74, and a magnet 76 attached to hub 66 via back iron 74, wherein cavity 102 is adjacent to magnet 76, as shown in one embodiment. Shaft 64 may be a fixed shaft as shown, for example, in FIG. 2 or a rotating shaft. Bearing assemblies 68 and 70 may suitably be ball bearing assemblies as shown in FIG. 2 or a fluid bearing assembly. Bracket 72 includes an inner portion 78, which in one embodiment is used to support inner diameter 92 of stator 80, as best shown in FIG. 3. Bracket 72 includes a stator attachment surface 96 defined on inner portion 78 and stator support structure 86 is disposed between bracket 72 and lower surface 99 of stator tooth 84. In one embodiment, stator support structure 86 supports outer diameter 94 of stator 80 with inner diameter 92 of stator 80 being attached to stator attachment surface 96. Coil 82 is wound around each respective stator tooth. Bracket 72 includes an annular surface 87 upon which stator support structure 86 is suitably attached. In another embodiment, stator support structure 86 may be integrally formed with bracket 72. As best shown in FIG. 3, stator tooth 84 includes an upper surface, generally denoted by 88, which is symmetrical with lower surface 99 in accordance with an embodiment of this invention. In another embodiment, a stator support structure may support an inner diameter of a stator with its outer diameter being attached to a stator attachment surface.

Continuing with FIG. 5 in which an enlarged view of an embodiment of this invention is shown, lower surface 99 includes a step 106 and upper surface 98 includes a step 108. The height of each step may suitably be the thickness of approximately one to three laminations in stator 80. Such steps may be suitably formed via a punching operation. In accordance with one embodiment, upper surface 98 and lower surface 99 define cavity 102, via their respective steps 108, 106. In another embodiment, cavity 102 may be defined by either upper surface 98 or lower surface 99. For example, lower surface 99 may extend generally horizontally to distal end 95 while upper surface 98 of stator support structure 86 defines a cavity. In one embodiment, lower surface 99 extends horizontally from one side of coil 82 and includes the surface defined by step 106 which extends to distal end 95 and upper surface 98 includes an inner annular surface and the surface defined by step 108 which extends to distal end 95, as shown in FIG. 5. In one embodiment, spindle motor 26 includes an adhesive 100 disposed between upper surface 98 of stator support structure 86 and lower surface 99 of stator tooth 84. Cavity 102 allows a portion of adhesive 100 to flow into cavity 108 thereby preventing adhesive 100 from leaking into gap 104, the portion which may result from adhesive 100 applied to attach stator 80 to stator support structure 86.

Figure 4:
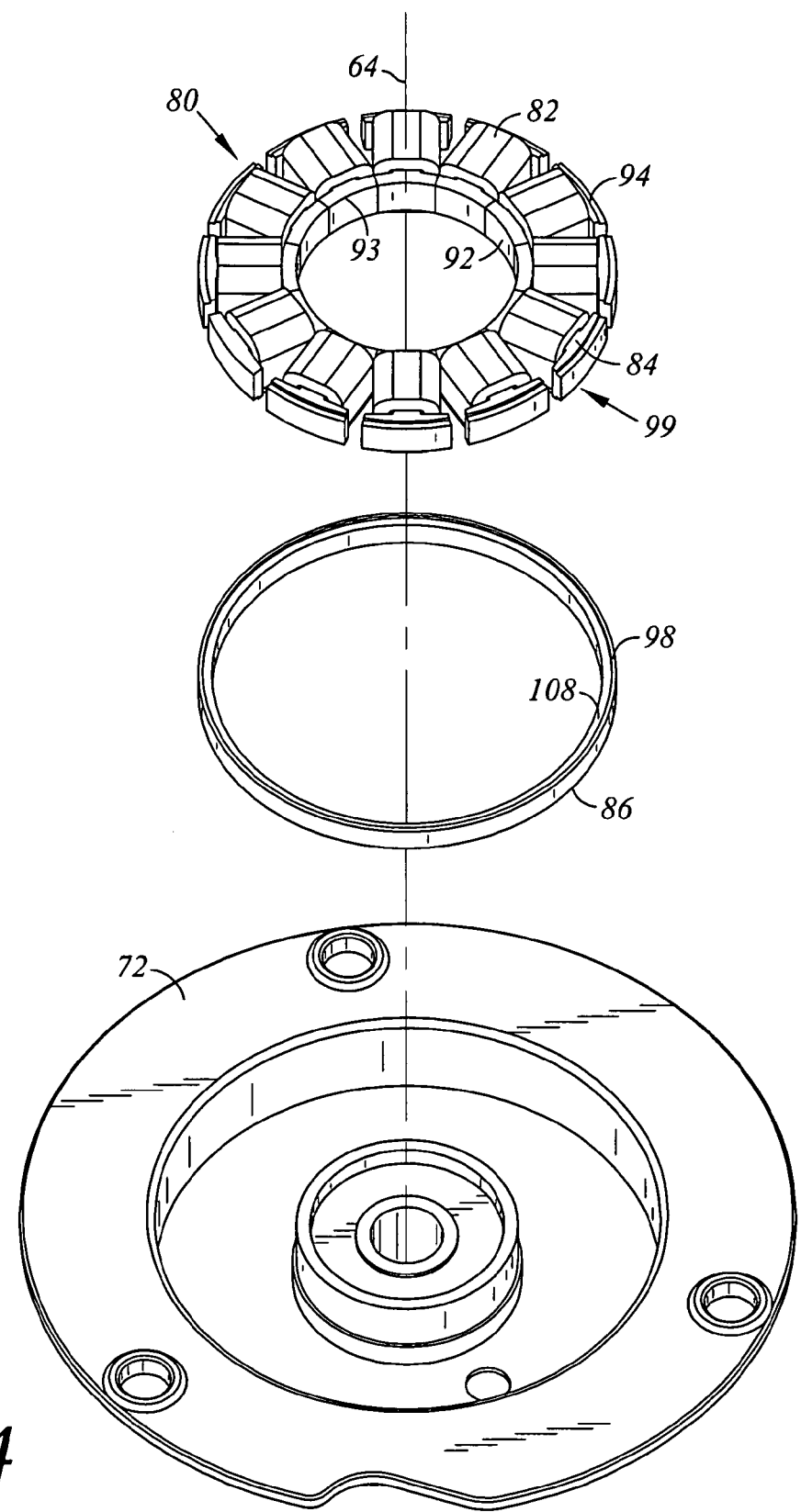
FIG. 4 is an exploded perspective view of a spindle motor bracket, a stator support structure, and a stator.

With reference to FIG. 4, bracket 72, stator support structure 86, and stator 80 are shown. In the embodiment shown, each stator tooth 84 extends out from an annular segment 93 which generally defines inner diameter 92 of stator 80. In one embodiment, step 108 of upper surface 98 extends continuously around the periphery of upper portion 98, as shown in FIG. 4. In another embodiment, step 108 may be formed intermittently around the periphery such that it is generally circumferentially coextensive with the distal "shoes" of each stator tooth. In one embodiment, bracket 72 may be part of a spindle motor which is then attached to a base of a disk drive. In another embodiment, bracket 72 may be integrally formed with a base of a disk drive.

Figure 6:
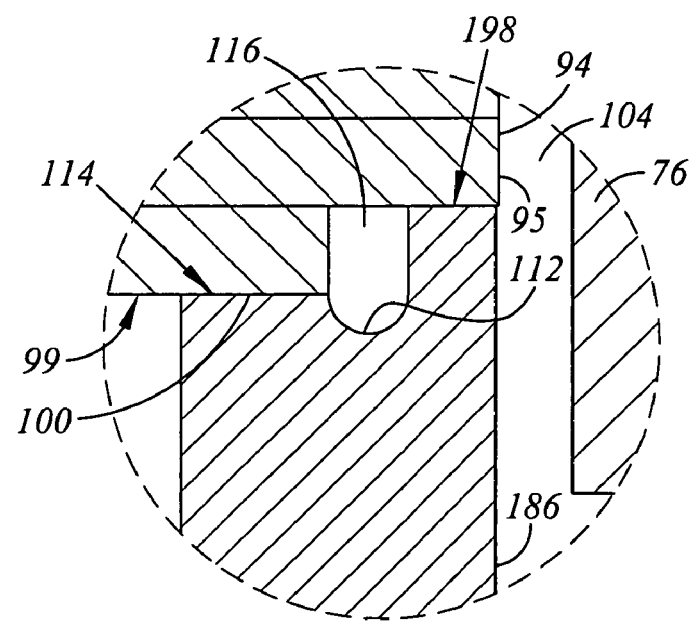
FIG. 6 is an enlarged cross section view of a portion of a spindle motor in accordance with another embodiment of this invention.

With reference to FIG. 6 in which another embodiment of this invention is shown, a cavity 116 is defined by lower surface 99 and an upper surface 198 of a stator support structure 186. Cavity 116 includes a trough 112 adjacent to an annular surface 114 of upper surface 198.

What is claimed is:

1. A spindle motor for a disk drive, comprising:
    a shaft;
    a hub;
    a magnet attached to the hub;
    a bearing assembly disposed between the hub and the shaft for allowing the hub to rotate;
    a bracket;
    a stator including:
        an annular segment attached to the bracket;
        a stator tooth extending from the annular segment and having a distal end,
        the distal end facing the magnet;
    a coil wound around the stator tooth between the annular segment and the distal end;
    the stator tooth having a lower surface extending between the coil and the distal end of the stator tooth;
    a stator support structure attached to the bracket and having an upper surface in contact with the lower surface;
    wherein at least one of the upper surface of the stator support structure and the lower surface of the stator tooth defines a cavity.

2. The spindle motor of claim 1, wherein the upper surface of the stator support structure and the lower surface of the stator tooth define the cavity.

3. The spindle motor of claim 2, wherein each of the lower surface of the stator tooth and the upper surface of the stator support structure includes a step.

4. The spindle motor of claim 2, wherein the stator support structure includes a trough adjacent to an annular surface of the upper surface of the stator support structure.

5. The spindle motor of claim 1, comprising:
    an adhesive disposed between the upper surface of the stator support structure and the lower surface of the stator tooth.

6. The spindle motor of claim 5, wherein the cavity allows a portion of the adhesive to flow into the cavity.

7. A spindle motor for a disk drive, comprising:
    a shaft;
    a hub;
    a bearing assembly disposed between the hub and the shaft for allowing the hub to rotate;
    a stator including:
        an inner diameter;
        an outer diameter;

a stator tooth having a distal end;
a coil wound around the stator tooth;
the stator tooth having a lower surface extending between the coil and the distal end of the stator tooth;
a stator support structure supporting one of the inner and outer diameters, the stator support structure having an upper surface facing the lower surface;
wherein at least one of the upper surface of the stator support structure and the lower surface of the stator tooth defines a cavity;
wherein the stator support structure supports the outer diameter of the stator; and
a bracket having a stator attachment surface;
the stator support structure disposed between the bracket and the lower surface of the stator tooth, the stator support structure supporting the outer diameter of the stator;
wherein the inner diameter of the stator is attached to the stator attachment surface.

8. A spindle motor for a disk drive, comprising:
a shaft;
a hub;
a bearing assembly disposed between the hub and the shaft for allowing the hub to rotate;
a stator including:
  an inner diameter;
  an outer diameter;
  a stator tooth having a distal end;
a coil wound around the stator tooth;
the stator tooth having a lower surface extending between the coil and the distal end of the stator tooth;
a stator support structure supporting one of the inner and outer diameters, the stator support structure having an upper surface facing the lower surface;
wherein at least one of the upper surface of the stator support structure and the lower surface of the stator tooth defines a cavity;
wherein the stator support structure supports the outer diameter of the stator; and
a magnet attached to the hub;
wherein the cavity is adjacent to the magnet.

9. A disk drive comprising:
a base;
a spindle motor attached to the base;
a disk supported by the spindle motor;
the spindle motor including:
  a shaft;
  a hub;
  a bearing assembly disposed between the hub and the shaft for allowing the hub to rotate;
  a stator including:
    an inner diameter;
    an outer diameter;
    a stator tooth having a distal end;
    a coil wound around the stator tooth; the stator tooth having a lower surface extending between the coil and the distal end of the stator tooth;
  a stator support structure supporting one of the inner and outer diameters, the stator support structure having an upper surface facing the lower surface;
  wherein at least one of the upper surface of the stator support structure and the lower surface of the stator tooth defines a cavity;
  wherein the stator support structure supports the outer diameter of the stator; and
  wherein the spindle motor further includes a bracket having a stator attachment surface;
  the stator support structure disposed between the bracket and the lower surface of the stator tooth, the stator support structure supporting the outer diameter of the stator;
  wherein the inner diameter of the stator is attached to the stator attachment surface.

10. A disk drive comprising:
a base;
a spindle motor attached to the base;
a disk supported by the spindle motor;
the spindle motor including:
  a shaft;
  a hub;
  a bearing assembly disposed between the hub and the shaft for allowing the hub to rotate;
  a stator including:
    an inner diameter;
    an outer diameter;
    a stator tooth having a distal end;
    a coil wound around the stator tooth; the stator tooth having a lower surface extending between the coil and the distal end of the stator tooth;
  a stator support structure supporting one of the inner and outer diameters, the stator support structure having an upper surface facing the lower surface;
  wherein at least one of the upper surface of the stator support structure and the lower surface of the stator tooth defines a cavity;
  wherein the stator support structure supports the outer diameter of the stator; and
  a magnet attached to the hub;
  wherein the cavity is adjacent to the magnet.

11. A disk drive comprising:
a base;
a spindle motor attached to the base;
a disk supported by the spindle motor;
the spindle motor including:
  a shaft;
  a hub;
  a magnet attached to the hub;
  a bearing assembly disposed between the hub and the shaft for allowing the hub to rotate;
  a bracket;
  a stator including:
    an annular segment attached to the bracket;
    a stator tooth extending from the annular segment and having a distal end, the distal end facing the magnet;
  a coil wound around the stator tooth between the annular segment and the distal end;
  the stator tooth having a lower surface extending between the coil and the distal end of the stator tooth;
  a stator support structure attached to the bracket and having an upper surface in contact with the lower surface;
  wherein at least one of the upper surface of the stator support structure and the lower surface of the stator tooth defines a cavity.

12. The disk drive of claim 11, wherein the upper surface of the stator support structure and the lower surface of the stator tooth define the cavity.

13. The disk drive of claim 12, wherein each of the lower surface of the stator tooth and the upper surface of the stator support structure includes a step.

14. The disk drive of claim 12, wherein the stator support structure includes a trough adjacent to an annular surface of the upper surface of the stator support structure.

15. The disk drive of claim 11, comprising:

an adhesive disposed between the upper surface of the stator support structure and the lower surface of the stator tooth.

16. The disk drive of claim 15, wherein the cavity allows a portion of the adhesive to flow into the cavity.

* * * * *